May 3, 1938. R. M. BARTMESS 2,115,937
DISPLAY DEVICE
Filed Feb. 3, 1937 2 Sheets-Sheet 1
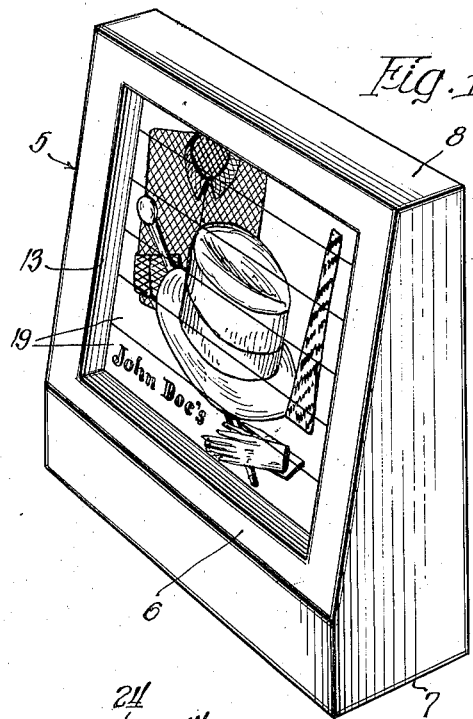
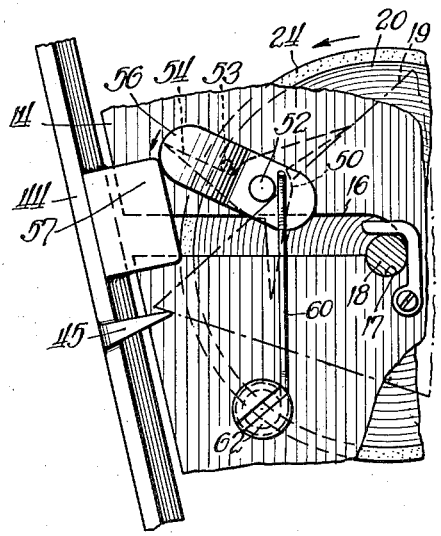
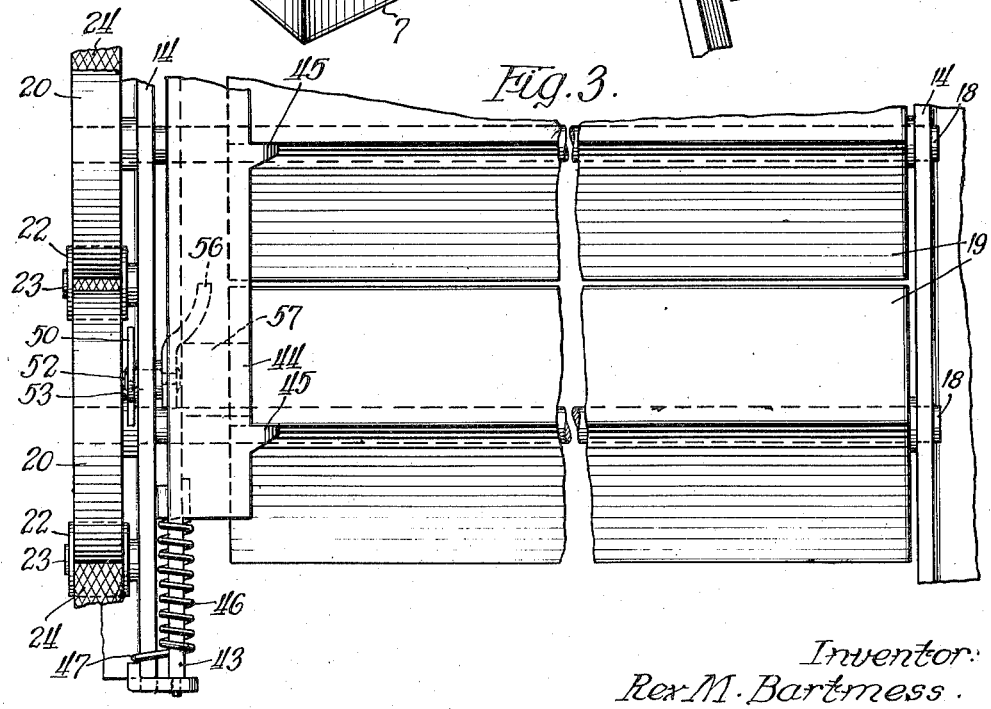
Inventor:
Rex M. Bartmess May 3, 1938.  R. M. BARTMESS  2,115,937
DISPLAY DEVICE
Filed Feb. 3, 1937  2 Sheets-Sheet 2

Inventor:
Rex M. Bartmess.
By Brown, Jackson, Boettcher & Dienner
Attys.

Patented May 3, 1938

2,115,937

UNITED STATES PATENT OFFICE 2,115,937

DISPLAY DEVICE

Rex M. Bartmess, Elkhart, Ind.

Application February 3, 1937, Serial No. 123,800

16 Claims. (Cl. 40—76)

This invention relates to display devices, and more particularly is directed to display devices for advertising purposes employing a mechanically actuated unit whereby a plurality of display surfaces are successively presented to view.

It is well known in the prior art to provide a plurality of polygonal shaped members mounted in such relation and so pivoted that they can be conjointly rotated to present a plurality of planar advertising or display surfaces. However, such devices have heretofore been bulky, not positive in operation, and have required rather intricate operating mechanisms increasing the spacial requirements of the device and including relatively expensive constituent parts requiring a considerable amount of skill in constructing and assembling the same into operative relation.

The present invention has as one of its primary objects the provision of a simple, inexpensive device in which the space required for the operating mechanism is kept at a minimum, and which can be easily and quickly assembled and disassembled, facilitating the changing of the display surfaces.

Another object of the present invention is the provision of a structure which can be readily formed from sheet metal stampings, and requires no expensive machining operations.

In the preferred form of the present invention, I preferably provide a frame having mounted therein a plurality of triangularly shaped display members, pivoted on parallelly spaced shafts, with stop means normally holding the members against rotation, and driving means constantly rotating the shafts and capable of releasing the stop means at predetermined intervals to permit rotation of the display members into a new display position. The shafts are each provided with pulleys over which is trained a belt driven by any suitable device, such as an electric motor, a spring wound clockwork mechanism, or the like.

As a further feature of the invention, I preferably provide means for illuminating the display surface, with actuating mechanism synchronized with the movement of the display surface for throwing differently colored light upon each of the display surfaces.

Another feature of the present invention resides in an assembly whereby the display members may be readily removed from the device without requiring dismounting of the actuating mechanism.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a perspective view of the display device;

Figure 3 is an enlarged rear view of a portion of the operating mechanism taken substantially on line 3—3 of Figure 2;

Figure 4 is a side view of the actuating mechanism;

Figure 2:
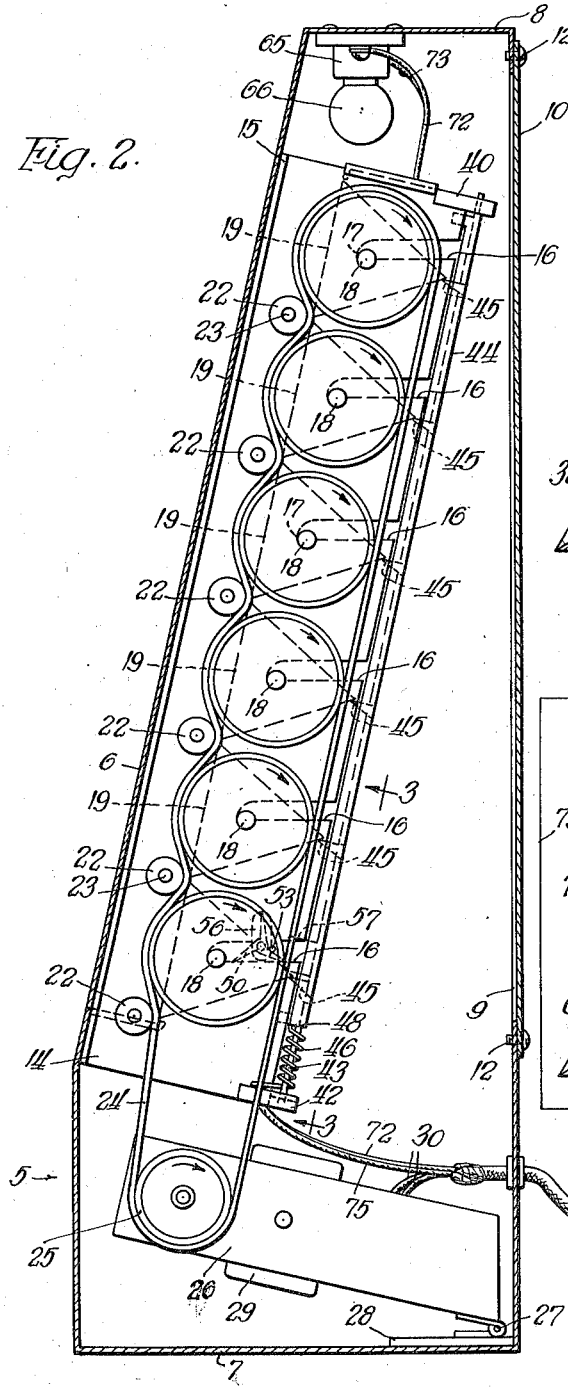
Figure 2 is a sectional view through one end of the device.

Referring now in detail to the drawings, the display device is indicated in its entirety by the reference numeral 5, and comprises an outer supporting frame member having a front face portion 6, a base portion 7, a top portion 8, and an opening 9 in the rear face thereof which may be closed by the closure plate 10 secured to the housing 5 by means of the screws 12.

Figure 5:
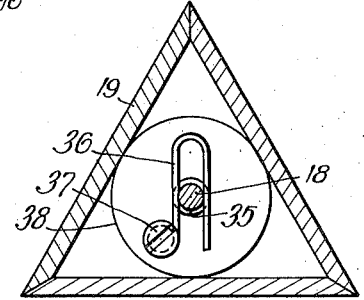
Figure 5 is a transverse sectional view showing the mounting of the display member on its shaft.

Secured to the sides of the display opening indicated at 13 in Figure 1, on the rear face of the front wall 6 of the casing, are a pair of plate or bracket members 14 having flanged portions 15 secured to the inner surface of the portion 6 of the casing, and having rearwardly extending planar portions provided with a plurality of horizontally extending notches 16 which are cut into the rear edge thereof and extend forwardly, terminating in shaft supporting recesses 17 adapted to receive the shafts 18 of a plurality of triangularly shaped display members indicated in detail in Figure 5.

The display members 19 are formed of metal plates suitably secured together, such as a triangularly shaped metal stamping or the like, and extend horizontally across the opening 13 of the display device, as indicated generally in Figure 3, being supported at opposite ends on the flange portion 14 by the shaft 18 secured therein. At one end, the shafts 18 project beyond the flanges 14 and are adapted to carry pulley wheels 20 on the projecting ends thereof, these wheels 20 being mounted for driving engagement on the shafts 18. Positioned laterally of and between each adjacent pair of pulley wheels are pulley idlers 22 suitably supported in the flange 14 for rotation upon shafts 23, and adapted to train the belt 24 over a portion of the periphery of each of the wheels or pulleys 20 as clearly shown in Figure 2.

The belt 24 extends over each of the pulley wheels 20 between the idler pulleys 22, and then extends downwardly on the opposite side of the pulleys 20, and at its lower end is looped about the drive wheel 25 carried on a suitable bracket 26 hinged at 27 to a base plate 28 secured to the base 7 of the stand, and adapted to be driven from an electric motor 29 through suitable reduction gearing. The motor 29 is operatively connected with a suitable source of current supply by the conductors 30 extending through the rear wall of the stand to a suitable plug connector 32 which may be connected to any suitable electric outlet.

By reason of the hinge support of the drive wheel 25 with respect to the stand, the weight of the motor and gear reduction assembly carried by the brackets 26 serves to impart sufficient tension to the drive belt 24 to insure that it will have positive frictional engagement with the pulleys 20, thereby effecting positive rotation thereof. If desired, the pulleys 20 may be covered with a suitable fabric or serrated surface material in order to increase the frictional engagement between the drive belt and the pulleys.

The triangular shaped display members 19 are frictionally mounted on the shafts 18 in such manner that they may be restrained from conjoint rotation therewith when desired, but, when released, will rotate with the shafts 18. In order to effect this result, I provide a suitable groove 35 formed in the shaft 18 adjacent one end thereof, which groove is adapted to be engaged by a spring clip member 36 as clearly shown in Figure 5, the clip member 36 being anchored by a screw 37 upon a mandrel 38 carried within the member 19. The mandrel 38 need be of only limited thickness, and may be disposed at the end of the member 19 remote with respect to the drive wheels or pulleys 20. In operation, when the member 19 is held against rotation, the shaft 18 slips within the spring clip 36, and the shaft, being constantly rotated by the belt 24 driven from the motor 29, rotates with respect to the display member 19 at a constant speed. Upon release of the means restraining the member 19 from rotation, the frictional engagement of the spring clip 36 in the groove 35 produces conjoint rotation of the member 19 with the shaft 18 until the member 19 is again restrained or locked against rotation.

In order to provide the proper display surface, it is obvious that cooperating surfaces of the members 19 must be maintained in alignment, as shown in Figures 1 and 2, in order to present a display surface produced by suitable advertising or other illustration carried by the aligned surfaces. With the display device as shown in the present application, three separate advertising surfaces are progressively presented to view in the opening 13 of the casing, these advertising displays being produced by the cooperating surfaces of the members 19 as they rotate from the position shown in Figure 2 to a position 120 degrees from the position shown in Figure 2, and thence to a position of 240 degrees from the position shown in Figure 2.

To hold the members 19 in position for a predetermined period in order that the advertisement appearing upon the cooperating surfaces may be properly viewed by the public, I provide suitable brackets 40 and 42 at opposite ends of the rear edge of one flange 14, which brackets form a pivotal support for a shaft 43 extending vertically therethrough. The shaft 43 carries an angle-shaped member 44, having one face thereof directed laterally of the bracket 14 and provided with a series of inturned hook portions 45 adapted to engage under the corners of the display members 19, as illustrated in Figure 2.

A suitable spring 46, biased at one end against the edge of the bracket 14, as indicated at 47, and at its other end engaging the inturned face portion 48 of the member 44, normally holds the member 44 in position with the inturned hooks 45 thereof engaging the respective corners of the display members 19 to hold their cooperating faces in parallel alignment.

The member 44 is movable outwardly or pivoted about the shaft 43 by means of an actuating mechanism shown in detail in Figure 4. Considering this mechanism in detail, there is provided at one side of the bracket member 14 a star wheel 50 pivotally supported upon a shaft 52 extending through the bracket. The star wheel 50 is provided with three extending arm portions which are adapted to be selectively engaged by a pin member 53 carried on the inner surface of the cooperating pulley 20 associated with the lowermost display member. The pin 53, in its rotation, engages an arm 54 of the star wheel 50, and rotates the star wheel through an angle of 120 degrees during one rotation of the pulley 20. Keyed to the shaft 52 on the opposite side of the bracket 14 is an arm 56 which has conjoint rotation with the star wheel 50. It is thus apparent that the arm 56 completes one rotation for each three rotations of the pulley 20. The arm 56, in rotating from the position shown in Figure 4 to the next position of the star wheel, brought about by engagement of the pin 53 with the arm 54, presses outwardly against the boss 57 formed on the inner surface of the member 44, and thus pivots the member 44 about the shaft 43 away from the display members 19, thus allowing the clips 36 carried by the display members to frictionally engage the shafts 18 to produce conjoint rotation of each of the display members under the influence of the pulleys 20 being rotated by the belt 24. As a result, the pulleys drive the display members for a rotation of 120 degrees, the member 44 in the meantime moving back under the influence of spring 46 so that the hooks 45 are in position to engage the next adjacent corner of the display members 19 to hold the display members against rotation so that they frictionally ride upon the shafts 18 for the next three rotations of the pulleys 20.

In order to prevent the offset weight of the arm 56 from rotating the star wheel assembly when not engaged by the pin 53, I provide a suitable spring member 60, supported at 62 upon the inner face of the bracket 14, which bears against the arm assembly to hold it frictionally against movement except under the driving engagement of the pin 53.

In the operation of the construction as thus far described, it will be apparent that when the drive wheel 25 is constantly driving the belt 24, each of the pulleys 20 is rotating at a constant speed, and since each of the display members 19 is retained in position by the hooks 45, the pulleys and shafts will rotate while the display surface, such as illustrated in Figure 1, will remain motionless until three rotations of the pulleys have been effected, at which time the star wheel 50 has been rotated by the pin 53 through one complete revolution, thereby moving the arm 56 into engagement with the block or boss 57 to spring the bracket 44 out of engaging position, thereby releasing the display members 19 for conjoint rotation with the shafts 18. However, due to the fact that the star wheel 50 continues rotation, the arm 56 moves across the boss 57 and then moves below the boss, allowing the spring 46 to immediately return the bracket 44 to engaging position. As a result, as the adjacent corners of the display members 19 rotate toward the hooks 45, the hooks will be in position to stop rotation thereof, and the pulleys must again rotate through three revolutions before the display members are again released for movement into another display position. Thus, with a constant speed drive of the pulleys, I provide for rotation of the display members only at predetermined intervals, insuring that sufficient time will elapse for an appreciation of each of the display surfaces prior to movement of the members to present another display surface to view.

Figure 6:
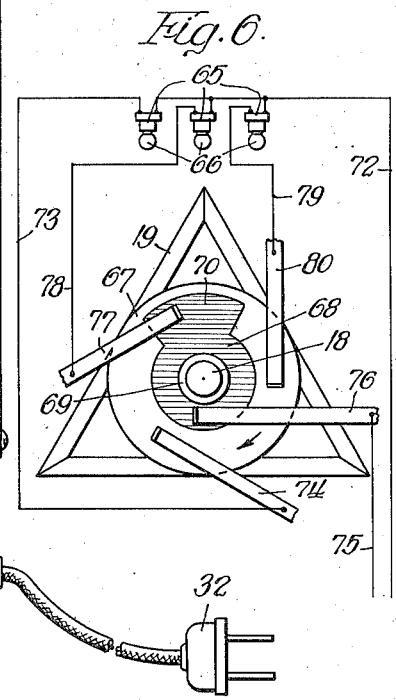
Figure 6 is a diagrammatic view of the switch actuating means for the light control.

In order to further enhance the attractive appearance of the device and to increase its advertising capacity, I provide in the upper portion of the stand, above the brackets 14, a series of sockets 65 which may be secured to the under surface of the top 8 of the casing, and which are adapted to carry differently colored lamp globes 66. Referring now in detail to Figure 6, it will be apparent that the globes 66, which have been arbitrarily indicated as green, white, and red, will be lighted in accordance with the movement of the display surfaces into the various positions of alignment. The upper display member 19, although any display member may be so employed, is adapted to carry an insulating circular disc 67 at one end thereof, which is keyed for conjoint rotation with the display member. This insulating disc 67 is adapted to carry a contact arm 68 having the annular portion thereof surrounding the shaft 18 and spaced therefrom by the gap 69, and also having an extending portion 70 for a purpose to be hereinafter described. Each of the sockets 65 has one terminal thereof connected to a conductor 72 leading to a source of current supply, such conductor being indicated in Figure 2 as being carried within the same cable to the outlet plug 32.

The socket 65, carrying the green bulb 66, has its opposite terminal connected through conductor 73 with a contact finger 74 adapted to ride upon the surface of the disc 67, and to be engaged by the contact arm portion 70 as the member 19 rotates to position. At this time, the current will be conducted from the line conductor 75 through the common contact finger 76 engaging the contact disc 68, and thence through the contact arm 70 and contact finger 74 to the socket 65 carrying the green bulb, and thence through conductor 72 back to the line. Similarly, the socket carrying the white bulb is provided with a contact finger 77 connected through conductor 78 with the second terminal of the socket 65 thereof, and the socket 65 carrying the red bulb is connected through conductor 79 with a contact finger 80 also adapted to be engaged by the arm 70 in one position of the display member 19. It will therefore be obvious that as the display members 19 move from one of their display positions to another, the corresponding lamp will be cut out and another lamp energized to provide a different color effect over the display surface. It should also be noted that the upper portion of the casing is open between the brackets 14 so that light from the bulbs will be directed down over the display surfaces of the members 19.

In the manufacture of the present invention, it will be apparent that the case or stand 5 for carrying the mechanism can be formed of sheet metal stampings, wood, or the like, and that the display members 19 may be formed as simple stampings, soldered or otherwise secured together, as well as the brackets 14 and 44. The remaining portions of the device are standard machine parts which may be inexpensively manufactured and assembled in position, thus making a relatively light weight and economical structure capable of simplified assembly and capable of operating at relatively minimum cost.

I do not intend to be limited to the exact details shown and described in connection with the illustrated embodiment of the invention, but only insofar as defined by the scope and spirit of the appended claims.

I claim:

1. In a display stand of the class described, a plurality of parallel vertically spaced shafts, means for continuously rotating said shafts at a uniform speed, display members on said shafts having cooperating display surfaces rotatable into and out of display alinement, means frictionally driving said members from said shafts, latching means engaging said display members for preventing rotation thereof, and means operable upon predetermined rotation of said shafts for releasing said locking means to permit conjoint rotation of said display members and shafts.

2. In combination, a display stand having a display opening in the front surface thereof, bracket means extending rearwardly along the vertical edges of said opening, a plurality of parallel vertically spaced shafts carried by said brackets, polygonally shaped display members carried by each of said shafts between said brackets and arranged to be frictionally rotated thereby, means for holding said display members against rotation, driving means for continuously rotating all of said shafts, and means operable upon predetermined operation of said driving means for releasing said holding means to permit said display members to rotate conjointly with said shafts.

3. The combination, with a plurality of cooperating alined polygonal display members having the sides thereof adapted to be selectively rotated into alinement to present successive display material, of driving means comprising continuously operating driving devices individual to said display members and having frictional driving engagement with said members, means for restraining said members against rotation, and means operable by said driving means for releasing said restraining means at predetermined intervals to effect rotation of said members into a succeeding display position.

4. The combination, with rotatably mounted triangularly shaped display members having their axes in spaced relation to produce display surfaces when the corresponding sides are rotated into planar alinement, of continuously actuated rotating shafts for said members, means frictionally connecting said members to said shafts, means for conjointly restraining said members against rotation and maintaining them in display alinement, and means operated after a predetermined rotation of said shafts for releasing said restraining means to permit conjoint rotation of said members, said restraining means including means for restoring said restraining means into restraining position to hold said display members in the next succeeding position of alinement.

5. In combination, rotatably mounted triangularly shaped display members spaced to produce complementary display material when the corresponding sides are rotated into planar alinement, separate driving devices individual to each of said members and continuously effective to produce rotation thereof, and means for preventing rotation of said members by said driving devices except at predetermined intervals and then only through an angle such as to place the next succeeding corresponding sides in display alinement.

6. In combination, rotatably mounted triangularly shaped display members spaced to produce complementary display material when the corresponding sides are rotated into planar alinement, driving means connected to said members and continuously effective to produce rotation thereof, means for preventing rotation of said members by said driving means except at predetermined intervals and then only through an angle such as to place the next succeeding corresponding sides in display alinement, and lighting means selectively operable upon rotation of one of said display members for directing differently colored light rays over each succeeding display formed by the alinement of corresponding sides.

7. In combination, a pair of parallel spaced brackets having horizontally extending slots therein provided with notches for supporting parallel spaced shafts for rotation, pulleys on each of said shafts, display members on said shafts, a driving belt engaging said pulleys for effecting conjoint rotation of said shaft, and driving means for said belt including a hinged support below said brackets whereby the weight of said driving means tensions said belt over said pulleys.

8. In combination, a plurality of vertically spaced shafts each carrying display members thereon having complementary corresponding sides for producing a plurality of different display surfaces, continuously actuated driving means for said shafts, a motion transmitting connection between said driving means and said shafts tensioned by the weight of said driving means, and means for preventing rotation of said display members except at intervals determined by said driving means.

9. In combination, a plurality of display members mounted for conjoint rotation about spaced axes and having complementary sides successively moved into alinement to produce a plurality of advertising positions, constantly operated driving means, means restraining said members in each of said advertising positions, and means actuated upon predetermined movement of said driving means for releasing said restraining means to permit rotation of said members into the next succeeding advertising position.

10. In combination, a plurality of display members mounted for conjoint rotation about spaced axes and having complementary sides successively moved into alinement to produce a plurality of advertising positions, constantly operated driving means, means restraining said members in each of said advertising positions, and means actuated upon predetermined movement of said driving means for releasing said restraining means to permit rotation of said members into the next succeeding advertising position, said releasing means being returned to inoperative position in time to allow said restraining means to become operative to hold said members in the succeeding position during another predetermined movement of said driving means.

11. A display device comprising a plurality of parallelled disposed display members having corresponding complementary sides rotatable into successive planar alinement, means normally retaining said members in position with corresponding sides thereof in alinement, and driving means continuously effective to rotate said members including means for rendering said retaining means inoperative at predetermined intervals whereby said members are conjointly rotated by said driving means into a succeeding position of alinement.

12. A display device comprising a plurality of parallelled disposed display members having corresponding complementary sides rotatable into successive planar alinement, means normally retaining said members in position with corresponding sides thereof in alinement, driving means continuously effective to rotate said members including means for rendering said retaining means inoperative at predetermined intervals whereby said members are conjointly rotated by said driving means into a succeeding position of alinement, and means operative in each position of alinement of said members for energizing a light source above said members.

13. A display device of the class described including a triangularly shaped display member, a shaft extending through said member and having a drive pulley at one end thereof, means carried by said display member for frictionally engaging said shaft to effect conjoint rotation therebetween, means continuously driving said pulley and shaft in one direction, a pivoted hook member engaging a portion of said member for normally restraining rotation of said member, means for pivoting said hook member out of restraining position, means carried by said pulley for actuating said pivoting means after a predetermined revolution of said pulley, and spring means for restoring said restraining means, said pivoting means being operable by said actuating means for an interval less than one third of the time necessary for one revolution of said pulley.

14. A display device including a polygonally shaped tubular display member, a constantly rotating shaft extending therethrough and frictionally engaging said member for conjoint rotation therewith, means normally restraining rotation of said member with said shaft, and means operated at predetermined intervals during rotation of said shaft for releasing said restraining means during a partial revolution of said shaft.

15. In combination, a plurality of vertically spaced cooperating aligned polygonal display members having the sides thereof adapted to be selectively rotated into alignment to present successive display material, continuously operating driving means having frictional driving engagement with said members, means for restraining said members against rotation, and means operable by said driving means for releasing said restraining means at predetermined intervals to effect rotation of said members into a succeeding display position.

16. In combination, a plurality of display members mounted for conjoint rotation and having complementary sides successively moved into alignment to produce a plurality of advertising positions, driving means comprising continuously operated driving devices individual to each of said display members, means restraining said members in each of said advertising positions, and means actuated upon predetermined movement of said driving means for releasing said restraining means to permit rotation of said members into the next succeeding advertising position, said releasing means being returned to inoperative position in time to allow said restraining means to become operative to hold said members in the succeeding position during another predetermined movement of said driving means.

REX M. BARTMESS.